Figure 1:
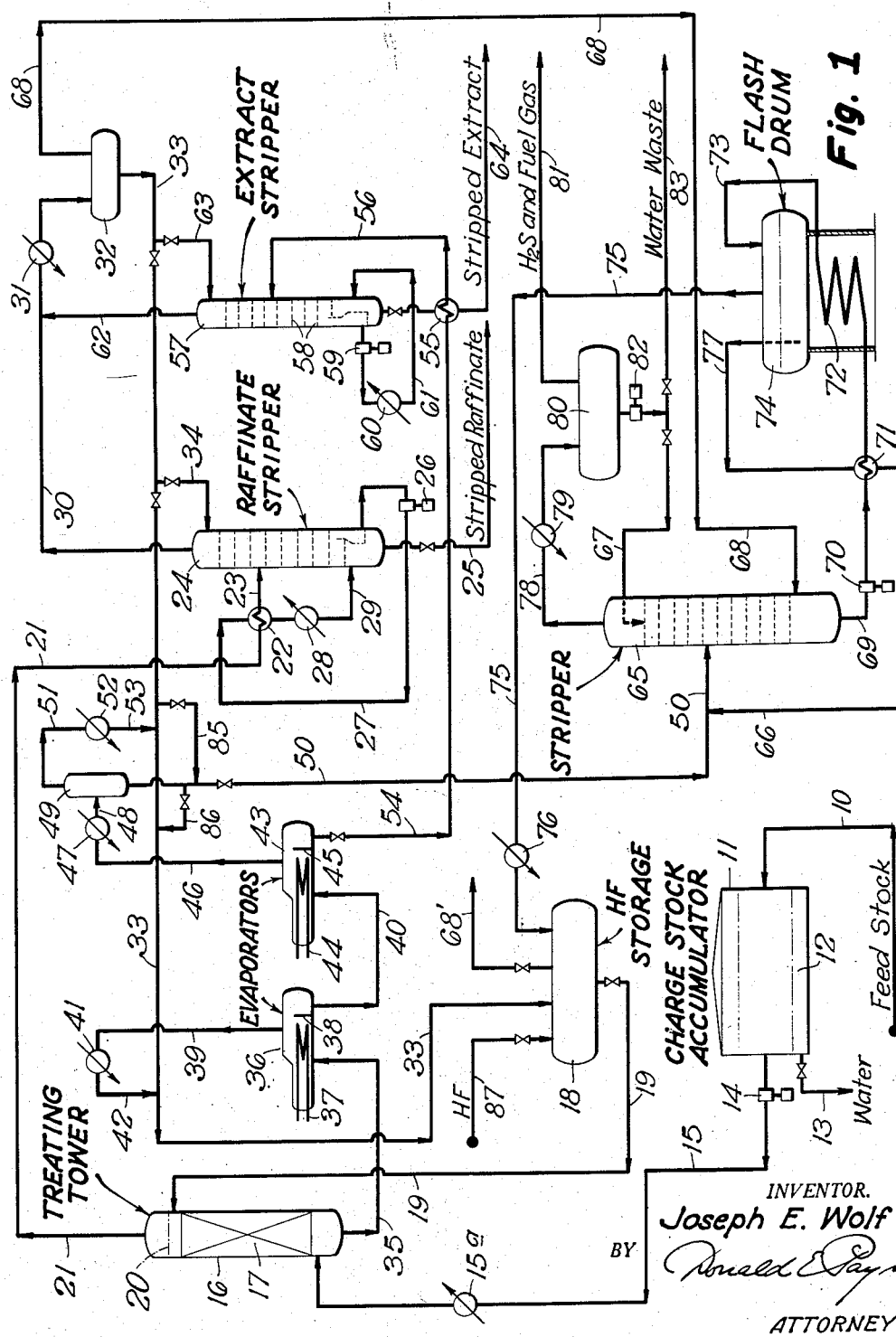

INVENTOR.
Joseph E. Wolf
BY
ATTORNEY

Dec. 14, 1954   J. E. WOLF   2,697,065
HYDROGEN FLUORIDE TREATING SYSTEM
Filed April 28, 1951   2 Sheets-Sheet 2

INVENTOR.
Joseph E. Wolf
BY
Donald E. Payne
ATTORNEY

United States Patent Office 2,697,065
Patented Dec. 14, 1954

2,697,065

HYDROGEN FLUORIDE TREATING SYSTEM

Joseph E. Wolf, Hammond, Ind., assignor to Standard Oil Company, Chicago, Ill., a corporation of Indiana Application April 28, 1951, Serial No. 223,552

7 Claims. (Cl. 196—31)

This invention relates to purification of hydrogen fluoride in order to obtain substantially pure hydrogen fluoride from hydrogen fluoride streams containing impurities such as water, hydrogen sulfide, etc. More particularly the invention pertains to the integration of such hydrogen fluoride purification with a commercial process and apparatus for refining high boiling hydrocarbon oils with liquid hydrogen fluoride.

It is known that many charging stocks for catalytic cracking processes contain large amounts of sulfur and also contain polycyclic aromatic hydrocarbons and other components which are undesirable in such charging stocks because said components have a deleterious affect on catalyst activity and/or they produce unduly large amounts of coke during the cracking step, thereby decreasing the potential capacity of a commercial catalytic cracking unit, increasing operating costs, and decreasing yields of valuable products. It is desirable to remove these objectionable components from such charging stocks by treating and/or extracting them with substantially anhydrous liquid hydrogen fluoride, but such extraction has presented many problems. One of the most vexatious of these problems is that of preventing build-up of impurities in the hydrogen fluoride recovered from the raffinate and extract and recycled in the system. Certain of the recovered hydrogen fluoride streams are contaminated with excessive amounts of water which cannot be removed from the hydrogen fluoride by simple distillation because of the constant boiling mixture which is formed. Other gasiform streams contain large amounts of hydrogen sulfide and other extraneous gases from which must be separated hydrogen fluoride contained therein. Any processes heretofore considered for purification of such streams have been unduly cumbersome, costly and inefficient particularly since they either fail to effect recovery of hydrogen fluoride in the desired purity or they resulted in excessive hydrogen fluoride losses. An object of the invention is to provide a method and means for effecting removal of objectionable components such as water, hydrogen sulfide, etc. from hydrogen fluoride streams which will result in production of substantially anhydrous hydrogen fluoride, which will result in negligible hydrogen fluoride losses and which will be simpler and less expensive than processes heretofore employed.

A further object is to provide an improved method and means for producing substantially anhydrous hydrogen fluoride from aqueous hydrogen fluoride. Another object is to provide an improved method and means for recovering substantially all hydrogen fluoride from a gasiform stream so that other components of said stream, such as hydrogen sulfide, hydrocarbons, etc., may be vented without suffering hydrogen fluoride losses. The objective of maintaining hydrogen fluoride losses at a minimum is essential not only from the standpoint of material costs, but it is extremely important from the standpoint of the safety and health of the operators because hydrogen fluoride is known to be extremely toxic.

A further object of the invention is to provide an integrated system for recovering substantially anhydrous hydrogen fluoride from a plurality of streams, at least one of which contains inert gases and hydrogen sulfide as major impurities while another contains water as a major impurity. Another object is to integrate such a purification system with a commercial unit for extracting high boiling hydrocarbon charging stocks such as reduced crude oil and virgin, thermally cracked or catalytically cracked fractions thereof such as gas oils, furnace oils, heater oils or the like.

It is known that substantially anhydrous hydrogen fluoride may be recovered from aqueous hydrogen fluoride by adding potassium fluoride in an amount sufficient to form $KHF_2$, heating the latter to drive off the water at low temperature and then heating to drive off anhydrous HF at a higher temperature; this basic principle is attributed to Fremy and $KHF_2$ is called Fremy salt. U. S. 2,428,524 describes a process for resolving aqueous HF by a three stage distillation system employing potassium fluoride wherein a part of the water is removed overhead from the first distillation step, a mixture of water and HF is taken overhead from the second distillation step and anhydrous HF is obtained from this last named mixture in a third distillation step, a constant boiling mixture being recycled from the third to the first distillation step. An object of my invention is to eliminate the necessity of employing these three distillation steps and to provide a process which will eliminate substantially all of the water in the first stripping step and provide for recovery of substantially anhydrous HF in a subsequent flashing step. A further object is to provide a system for utilizing gaseous by-products formed in an HF treating system for facilitating removal of water from an aqueous HF stream likewise formed in said treating system and for accomplishing the elimination of both water and gaseous impurities in a single column without loss of significant amounts of hydrogen fluoride.

My invention will be described as applied to a system for extracting with substantially anhydrous hydrogen fluoride a high sulfur gas oil containing dissolved water in which system there is a tendency for build up of both water and hydrogen sulfide in the system. By use of a partial evaporation and/or partial condensation steps and stream segregation, I concentrate the net amount of introduced water in a relatively small aqueous HF stream and I obtain a gaseous stream which contains large amounts of HF vapors along with gaseous impurities such as normally gaseous hydrocarbons and $H_2S$. I introduce the aqueous HF stream at an intermediate level in a stripper column and at approximately the same level in the same column I introduce a large amount of a hot liquid KF-HF mixture, the amount of said mixture being about 5 to 15 times by weight the amount of aqueous HF introduced, and the temperature of the mixture being about 300 to 400° F., i. e. about 350° F. Water is introduced at the top of the column in amounts sufficient to maintain the temperature of the top of the column at approximately 212° F. for atmospheric pressure operation, this water reflux insuring a substantially HF-free overhead and maintaining the columnn in heat balance. The gaseous HF stream containing normally gaseous hydrocarbons and $H_2S$ is introduced near the base of the column where the temperature is about 220–350° F. and may, for example, be about 240° F. The overhead from the column is cooled to effect condensation of the bulk of the water, a large amount of which is recycled as reflux to the top of the column, the uncondensed overhead constituting a fuel gas stream containing substantially all of the $H_2S$ and normally gaseous hydrocarbons with no significant amount of hydrogen fluoride. The bottoms from the column are preheated in an exchanger, then heated in coils and flashed at about 400–600° F., and may be e. g. 500° F. (when the pressure is about 15 p. s. i. g.) to liberate substantially anhydrous hydrogen fluoride, the liquid from the flash chamber containing about 25–40% HF, e. g. about 33%, being passed through the heat exchanger and returned at the intermediate part of the stripping column.

It will be observed that the upper part of the stripping column serves as a reflux fractionator for minimizing HF losses while the lower part of the column serves as a stripper for removing a large amount of the water from the downwardly descending HF-KF mixture, a large amount of the water which would otherwise be withdrawn to the heating and flashing steps. It has been discovered that at temperatures maintained at the bottom of the column, $H_2S$ absorption is nil so that the H₂S and normally gaseous hydrocarbons do not contaminate the stripper bottoms but on the contrary facilitate removal of water therefrom and carry this water upwardly for discharge from the top of the column. The bottom of the column also absorbs the HF from the gas stream which absorption action provides heat to the downflowing HF-KF mixture and this facilitates the stripping of the water.

Figure 2:
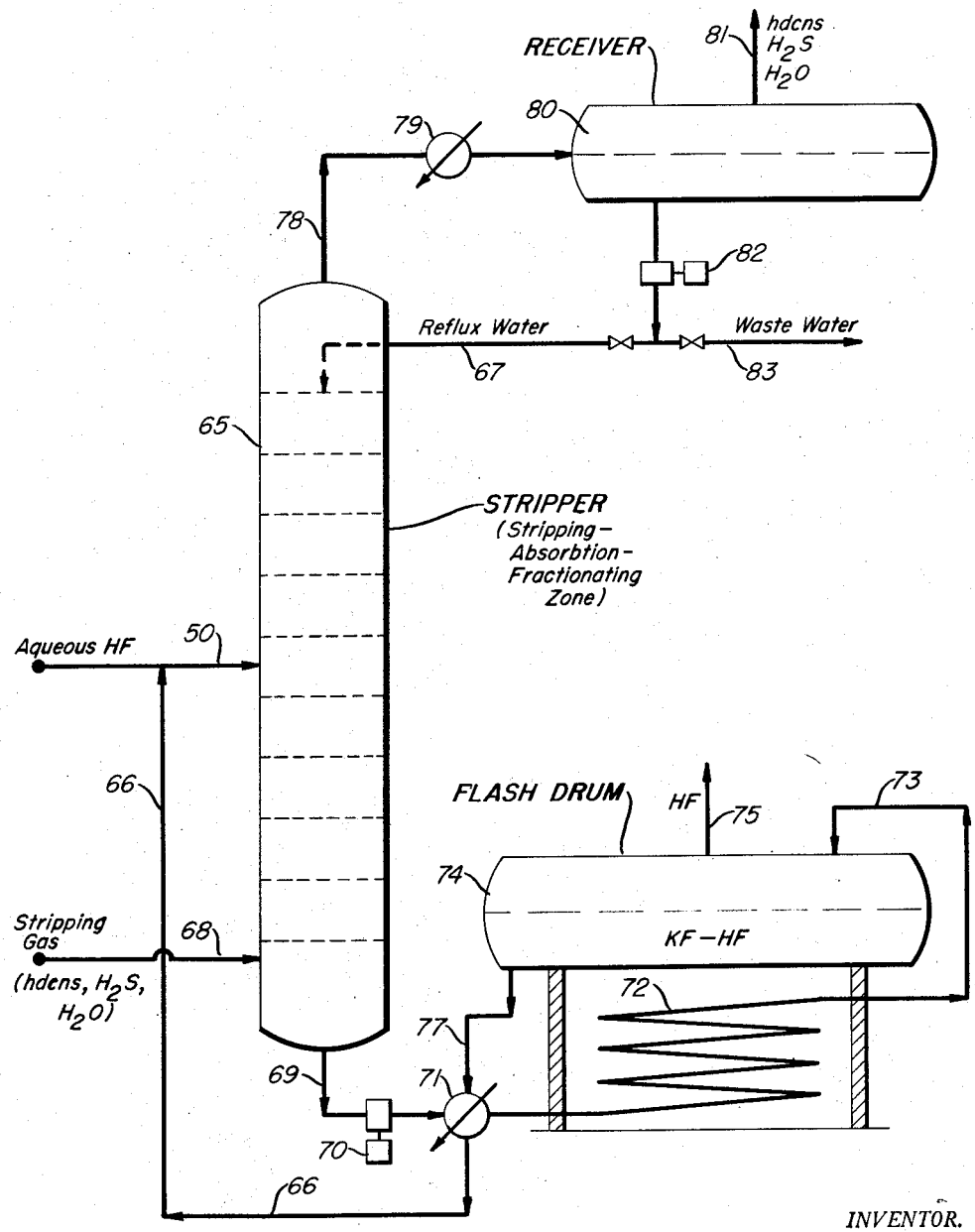

The invention will be more clearly understood from the following detailed description read in conjunction with the accompanying drawings which form a part of this specification and in which:

Figure 1 is a simplified flow diagram showing a commercial plant for utilizing the invention and Figure 2 is a schematic flow diagram of that portion of the commercial plant wherein anhydrous HF is recovered from both aqueous HF and a gas stream containing hydrocarbons, H₂S and HF.

While the invention in its broader aspects may be applied to the purification of hydrogen fluoride generally, i. e. regardless of the source and nature of the contaminants (provided that they are removable from the hydrogen fluoride by the described methods of contacting with KF-HF mixtures), it is particularly applicable to hydrocarbon conversion processes employing hydrogen fluoride as a catalyst and/or solvent and it will be described as employed in a commercial plant for refining with hydrogen fluoride, about 40,000 barrels per stream day of of a mixture of high sulfur virgin gas oil, coke still gas oil, and cracked gas oil, said mixture having an A. P. I. gravity of about 26.1° and a sulfur content of about 1.9 weight per cent, said mixture usually containing water in amounts which may be as high as 0.1% by weight. Such charging stock is preferably introduced by line 10 to an accumulator tank 11 wherein it is allowed to remain in a quiescent condition for a time sufficient to effect the settling of dispersed or emulsified water and the formation of a lower aqueous layer 12 which is withdrawn from the system through valved line 13. This simple settling is usually adequate for removing most of the dispersed water from the charging stock but if desired the settling may be facilitated by addition of known demulsifying agents and/or the charging stock may be passed through a coalescer or any other known means for facilitating separation of water from oil. The mixed gas oil charging stock (which may still contain as much as .1% by weight of water) is introduced by pump 14 through line 15 and heat exchanger 15a to the base of treating tower 16. The treating or extraction temperature should be in the range of 50 to 150° F. and it is preferably at about 120° F. Intimacy of contact in countercurrent tower 16 may be increased by employing baffle plates of known construction or packing material 17 such, for example, as carbon steel Rachig rings, Berl saddles, shaped monel screen fragments or expanded metal lath, such packing material being, of course, fabricated from HF resistant material. Intimacy of contact may also be attained by intimately dispersing charging stock into the acid phase by known distributors designed for that purpose.

Liquid substantially anhydrous hydrogen fluoride from accumulator or storage tank 18 is introduced through valved line 19 into tower 16 at a point near the top thereof and immediately above the packed zone 17. The counterflow of gas oil and hydrogen fluoride in tower 16 results in both extraction and chemical reaction. The interface 20 between acid and oil phases is preferably maintained at a high point in the column and is illustrated as being above the point of HF inlet so that the heavier acid phase is continuous throughout the countercurrent contacting section of the tower. It should be understood, however, that other known contacting means may be employed instead of or in addition to the illustrated countercurrent tower.

In this particular plant for charging 40,000 barrels per stream day, the oil charging rate is about 523,000 pounds per hour and in addition there may be about 500 pounds per hour of water. Hydrogen fluoride is introduced at the top of the tower at about 174,000 pounds per hour of which about 1,300 pounds (.75 weight per cent) is water, about 170 pounds is H₂S and about 470 pounds is HF-soluble oil derived from previous contact of the hydrogen fluoride reagent stream with gas oil charging stock.

The contacting in tower 16 is at a pressure sufficient to maintain both the hydrocarbons and the hydrogen fluoride in liquid phase, usually in the range of about 30 to 100 p. s. i. g., for example about 70 p. s. i. g. The total holding or residence time of the oil in tower 16 should be in the range of about 5 to 50 minutes, for example about 15 minutes.

The raffinate-oil phase is withdrawn from the top of tower 16 through conduit 21, heat exchanger 22, and conduit 23 into raffinate stripper tower 24 at the rate of about 405,000 pounds per hour. Stripped raffinate containing not more than about .01 weight per cent of HF is withdrawn through line 25 at the rate of about 401,500 pounds per hour; this raffinate may then be charged to a catalytic cracking unit of the fixed bed, moving bed, or fluid type employing solid siliceous catalyst either natural or synthetic and preferably of the silica alumina or silica magnesia type. Heat for the stripping operation is obtained by withdrawing liquid in the lower part of the stripper through pump 26, heat exchanger 22, line 27 and heater 28 and reintroducing the heated liquid through line 29. The stripper is operated with a top temperature in the range of 190 to 250° F., e. g. 215° F., a bottom temperature in the range of 500 to 650° F., e. g. 560° F., and at pressures between about atmospheric and 50 p. s. i. g., for example a top pressure of 8 p. s. i. g. and a bottom pressure of 10 p. s. i. g.

Overhead from raffinate stripper 24 is withdrawn through conduit 30 to condenser 31 and thence to receiver 32 from which the condensate may be returned by line 33 to HF storage tank 18, a part of the condensate being introduced by line 34 for use as reflux in stripper 24. Although this HF condensate contains some water and H₂S, these impurities are present in such amounts as to be tolerable in the system.

The acid extract phase from the base of the treating tower is withdrawn through line 35 to primary evaporator 36, which is provided with a heating coil 37 and a weir 38. This evaporator which may be of stainless steel is operated at a tempearture in the range of 150 to 250° F., e. g. 177° F., and a pressure in the range of 30 to 65 p. s. i. g., for example 53 p. s. i. g. with a liquid holding time of approximately 2 minutes. Under these conditions, about 35 to 40% of the free hydrogen fluoride is vaporized together with substantially all of the free (uncombined) H₂S and a portion of the water; the amounts of H₂S and water, however, are sufficiently small so that the vapors may be withdrawn through line 39, condenser 41 and lines 42 and 33 to HF storage tank 18.

Unvaporized liquid from primary evaporator 36 is withdrawn through line 40 to secondary evaporator 43 which is likewise of stainless steel and provided with heating coils 44 and weir 45. This second stage evaporator is operated at a temperature in the range of 200 to 300° F., e. g. 240° F., under a pressure in the range of about 10 to 50 p. s. i. g., for example 35 p. s. i. g., the liquid holding time of the order of about 3 minutes. Under these conditions about half of the originally contained hydrogen fluoride together with a substantial amount of the originally contained water, but practically no H₂S, is withdrawn in vapor form through conduit 46 to partial condenser 47 which provides sufficient cooling to condense about 10 to 25 weight per cent or preferably about 15 to 20 weight per cent of the HF in said vapor stream. The condensed and uncondensed vapors are then introduced by line 48 to separator 49 from which condensate is withdrawn by line 50 to my improved HF purification system. The stream thus withdrawn through line 50 consists of about 4,800 pounds per hour of HF and 530 pounds per hour of water; thus it will be seen that the total amount of water originally introduced and/or produced in the system is concentrated in a relatively small stream which greatly minimizes the HF purification problem. The overhead from separator 49 passes through line 51, condenser 52 and lines 53 and 33 to HF storage vessel 18.

Liquid from the second stage evaporator 43 is withdrawn through line 54, heat exchanger 55 and line 56 to extract stripper 57, which, like the raffinate stripper, may be provided with suitable bubble trays or equivalent gas-liquid contacting means 58. Heat is supplied to the extract stripper by withdrawing liquid from the base thereof through pump 59 and heater 60, the heated liquid being returned through line 61. The extract stripper is operated at a top temperature in the range of about 90 to 250° F., e. g. about 215° F., a bottom temperature in the range of 575 to 700° F., e. g. 640° F., and under a pressure in the range of about atmospheric to 50 p. s. i. g., for example about 10 p. s. i. g. Overhead from the stripper is withdrawn through line 62 to line 30 and reflux for the stripper may be supplied from line 33 by line 63. Stripped extract is withdrawn through line 64.

No novelty per se is claimed in the hydrocarbon oil extraction system thus far described since such system is described and claimed in copending application Ser. No. 134,518, of which I am a joint applicant (filed by Giachetto, Wagner and Wolf), now U. S. Patent 2,612,464. In the system of said copending application, however, the removal of impurities such as $H_2O$ and $H_2S$ from hydrogen fluoride streams involved azeotropic distillation and neutralization of a considerable amount of the hydrogen fluoride and it was thus not only cumbersome and expensive, but it resulted in loss of substantial amounts of hydrogen fluoride. My invention provides a simpler, less expensive and more efficient method and means for removing impurities from hydrogen fluoride streams and my invention is integrated with the system heretofore described in the manner which will now be set forth. In this connection reference may be made to Figure 2.

The hydrogen fluoride water stream, which contains about 4,800 pounds per hour of HF and 530 pounds per hour of water, is introduced by line 50 at an intermediate level in vessel 65 which serves the combined functions of a reflux fractionator, an absorber and a stripper. The vessel in this case may be a column about 4 feet in diameter, by 40 feet high with about 8 bubble trays below the inlet of line 50 and 8 bubble trays above said inlet. A hot liquid KF-HF stream at about 350° F. and containing about 40,000 pounds per hour of KF and 20,000 pounds per hour of HF is introduced by line 66 to line 50 and thence into vessel 65 or separately introduced into vessel 65 at about the same or slightly higher level. The vessel in this case is operated at about atmospheric pressure and sufficient water is introduced at the upper part thereof through line 67 to maintain the top temperature at about 212° F. (a higher top temperature, of course, being maintained when the tower is operated at higher pressure). At the base of tower 65, a gaseous stream is introduced through line 68, which gaseous stream may be a composite of gases withdrawn from the top of receiver 32 and gases withdrawn from the top of HF storage tank 18 through line 68'; the gaseous stream in this case contains about 13,055 pounds per hour of HF, 262 pounds per hour of $H_2S$ and 1135 pounds per hour of normally gaseous hydrocarbons. The bottom tower temperature in this case is maintained at approximately 240° F., at which temperature the $H_2S$ and normally gaseous hydrocarbons are unabsorbed while substantially all of the HF component of the gas is absorbed in the hot KF-HF liquid which is then withdrawn through line 69 by pump 70 and passed through heat exchanger 71, heating coils 72 and line 73 to the upper part of flash drum 74 which in this example operates under a pressure of 15 p. s. i. g. and a temperature of about 500° F. Vapors leaving the top of flash drum 74 through line 75 are condensed in cooler 76 and returned to HF storage vessel 18, said vapors containing about 17,853 pounds per hour of HF and only about 90 pounds per hour of water (the recovered HF thus containing only about .5% water).

The hot liquid from the lower part of flash drum 74 is withdrawn through line 77 and passed through exchanger 71 wherein it is cooled to a temperature of about 350° F., at which temperature it is returned through line 66 for reintroduction at an intermediate point into tower 65.

The overhead from tower 65 is withdrawn through line 78 and cooler 79 to receiver 80 which may be at about 150° F. and atmospheric pressure. The uncondensed gases which leave the top of receiver 80 through line 81 contain substantially all of the $H_2S$, namely 262 pounds per hour, and all of the hydrocarbons, namely 1135 pounds per hour together with about 300 pounds per hour of water vapor. This gaseous stream withdrawn through line 81 is thus suitable as a fuel gas since it contains no significant amount of HF. The large amount of $H_2S$ which is produced may be converted to free sulfur by the Claus process (note Ind. Eng. Chem., vol. 42, No. 10 (October 1950), pages 1938-1950).

The water condensate is removed from receiver 80 by pump 82 and about 5 to 6 gallons per minute of said condensate may be recycled through line 67 to serve as reflux at the top of tower 65. The net production of aqueous condensate is withdrawn through line 83 as waste which contains less than 1% HF.

From the foregoing description, it will be seen that I have accomplished the objects of my invention and have provided an overall system of much lower initial investment cost and with a yearly operating cost (on the 40,000 barrel per day unit herein described) which is upwards of a half million dollars less than the operating cost of previous designs. The invention is particularly applicable for use in the described system for extracting a high sulfur gas oil since under conditions employed therein, particularly in the extract stripper 57, considerable amounts of combined sulfur is liberated as $H_2S$ which is difficult to separate from the enormously larger amounts of HF with which it is mixed. Also there is a formation and/or liberation of gaseous hydrocarbons in this type of extraction system as well as in many other types of HF treating systems. These gaseous hydrocarbons, whether or not they also contain $H_2S$, are utilized in my invention as a stripping medium for the hot enriched KF-HF liquid which simultaneously absorbs the HF component of the gas stream.

In the system hereinabove described, it will be seen that the volume of HF streams requiring purification has been minimized by the use of multi-stage evaporators for removing solvent from extract and returning to HF storage those streams which contain tolerable amounts of impurities, i. e. amounts which can remain without causing a build-up of the impurities in the system as a whole. If it is desired to operate with HF of higher purity, additional water-containing HF may be introduced from line 33 to line 50 by line 85. On the other hand, if more condensate is produced in cooler 47 than is essential, a part of such condensate can be returned by line 86 to line 33. Any small amount of make up HF which is required is introduced into storage tank 18 by line 87.

Where it is desired to introduce the extract from treating tower 20 directly or through preheaters to extract stripper, the total overhead from both extract and raffinate strippers may be combined as described, for example in U. S. 2,532,495. The stripper overhead materials may be partially condensed to give an aqueous HF stream (analogous to partial condenser 47 and aqueous HF stream production in separator 49), the aqueous HF stream may be introduced at the intermediate point in vessel 65, and the uncondensed gas stream introduced through line 68 to vessel 65. Alternatively, substantially all condensible components may be separated from combined overhead from the strippers, the uncondensed gas being introduced through line 68 to stripper 65 and the total stripper overhead condensate may be subjected to partial evaporation to remove anhydrous HF therefrom and leave the aqueous HF stream for introduction through line 50 to stripper 65. My described HF recovery procedure may also be employed in systems where HF is absorbed from HF-containing gas in at least a portion of the charging stock (note U. S. 2,449,463), in which case aqueous HF or azeotrope may be introduced at the intermediate level in stripper column 65 while at least a portion of the gases unabsorbed in the charging stock is introduced at the lower part of stripping column 65. Other applications of the invention will be apparent from the above description to those skilled in the art. It will also be apparent that known equivalents of KF mixtures may be employed in place of the KF mixtures herein described, certain of such equivalents being disclosed for example in U. S. 2,428,524.

I claim:

1. The method of removing water from an aqueous hydrogen fluoride stream, which method comprises introducing said stream at an intermediate level in a vertical stripping-absorption-fractionating zone, also introducing at said intermediate level in said zone a sufficient amount of a liquid anhydrous KF-HF mixture to combine with the HF component of the HF stream and prevent substantial liberation of HF at temperatures immediately above those at which water is vaporizable therefrom, supplying sufficient heat to the intermediate part of said zone to effect vaporization of water from the resulting KF-HF liquid and withdrawing vaporized water overhead from the top of said zone, introducing at the base of said zone a gaseous stripping agent which is substantially free from water and which consists chiefly of gaseous hydrocarbons, H₂S and HF, passing said introduced gases upwardly through both the lower and upper parts of said zone for recovering HF therefrom in the KF-HF liquid and augmenting removal of water from the KF-HF mixture by the stripping action of the gaseous hydrocarbons and H₂S, withdrawing a hot stripped KF-HF liquid from the base of said zone, heating the withdrawn liquid to a temperature sufficiently high to liberate substantially anhydrous HF therefrom, separating liberated HF from the remaining hot liquid, and returning the remaining liquid for reintroduction at said intermediate level in said zone.

2. The method of claim 1 which includes the step of condensing water from overhead gases leaving the top of said zone and recycling at least a part of said water condensate as reflux liquid to the upper part of said zone.

3. The method of removing water from aqueous hydrogen fluoride which comprises introducing said aqueous hydrogen fluoride at an intermediate level in a stripping-absorption-fractionating zone, also introducing at an intermediate level in said zone a liquid KF-HF stream, said stream being substantially anhydrous and predominating in KF and said stream being introduced in such amounts as to combine with the HF portion of the aqueous hydrogen fluoride to give a total KF-HF composition of which the HF component does not materially exceed the KF component on a weight basis, introducing at the base of said zone a substantially anhydrous gas stream containing gaseous components unabsorbable by the KF-HF mixture, passing said last named components upwardly through said zone to augment removal of water from the KF-HF liquid in both the lower and upper parts of said zone, condensing water from the gases leaving the top of the zone, recycling as reflux to the upper part of said zone sufficient water to maintain a temperature in the top of said zone approximating that of boiling water, maintaining the lower part of said zone at a temperature of about 220° F. to 350° F., withdrawing HF-KF liquid from the base of said zone, heating the withdrawn liquid to a temperature of 400° F. to 600° F., flashing said heated liquid to remove substantially anhydrous HF from unvaporized liquid KF-HF and returning said last named liquid for reintroduction into said intermediate level of said zone.

4. The method of claim 3 wherein the hot KF-HF mixture introduced into said stripping-absorption-fractionating zone contains approximately twice as much KF as HF on a weight basis and wherein the hot KF-HF mixture withdrawn from the bottom of said zone is enriched in HF but contains less HF than KF on a weight basis.

5. The method of avoiding build up of impurities in hydrogen fluoride employed in a system for treating hydrocarbons wherein a hydrocarbon stream containing dissolved water is contacted with hydrogen fluoride under conditions to give raffinate and extract phases and hydrogen fluoride is removed from each phase to give a substantially anhydrous hydrogen fluoride stream, an aqueous liquid hydrogen fluoride stream, and a gasiform hydrogen fluoride stream containing gasiform impurities, which method comprises commingling with said aqueous liquid hydrogen fluoride stream approximately 5 to 15 parts by weight of a liquid KF-HF mixture containing about two parts KF to one part HF by weight and at a temperature in the range of 300° to 400° F., introducing the commingled streams at an intermediate point of a stripping-absorption-fractionating zone, introducing said gasiform hydrogen fluoride stream containing gasiform impurities into the lower part of said zone whereby hydrogen fluoride is absorbed from said gasiform stream and the unabsorbed components of said stream augment removal of water from the commingled liquid mixture, withdrawing hot HF-KF liquid which has been substantially freed from water from the base of said zone, heating the withdrawn liquid to a temperature of about 500° F., flashing the heated liquid to remove substantially anhydrous HF from unvaporized liquid, cooling the unvaporized liquid to said temperature in the range of 300 to 400° F., and returning it for reintroduction into said zone, condensing water from the overhead stream leaving said zone and returning a substantial amount of said water condensate to serve as a reflux in the top of said zone.

6. A refining process which comprises treating with hydrogen fluoride a hydrocarbon oil which contains sulfur compounds and which also contains a small amount of dissolved water, said treating being under conditions to form a raffinate phase consisting chiefly of hydrocarbons and an extract phase containing most of the hydrogen fluoride, sulfur and water, evaporating hydrogen fluoride from the extract phase in a plurality of stages, operating the first of said stages under conditions to remove substantially all of the free H₂S which may be present but only a portion of the hydrogen fluoride and water, operating the second of said stages under conditions to remove most of the remaining hydrogen fluoride and water without liberating additional hydrogen sulfide, stripping liquid from the second of said stages under conditions to remove the remainder of the hydrogen fluoride and to give a gasiform stream containing hydrogen fluoride, gaseous hydrocarbons and liberated H₂S, concentrating most of the water vaporized in the second of said stages in about 10 to 25% of the hydrogen fluoride separated in said stage and introducing said concentrate at an intermediate point in a stripping-absorption-fractionating zone, introducing at substantially the same level in said zone a large amount of a substantially anhydrous mixture of KF and HF from which HF removable at 500° F. has previously been separated, maintaining the lower portion of said zone at a temperature in the range of about 220° F. to 300° F., introducing said gasiform stream containing hydrogen fluoride, gaseous hydrocarbons and H₂S liberated in the extract stripping zone into the lower part of the stripping-absorption-fractionating zone, condensing water from the gases leaving the top of the stripping-absorption-fractionating zone and returning a substantial amount of water condensate as reflux liquid to the top of said last named zone, withdrawing hot KF-HF liquid from the base of the stripping-absorption-fractionating zone, heating this withdrawn mixture to a temperature of about 500° F., flashing substantially anhydrous HF from that portion of the heated liquid which is unvaporized at the flashing temperature, cooling the unvaporized liquid to a temperature in the range of 300 to 400° F. and returning the cooled liquid for reintroduction into the stripping-absorption-fractionating zone.

7. The method of removing substantially all of the water from an aqueous KF-HF liquid mixture which contains more KF than HF on a weight basis, which method comprises introducing said mixture at the mid point of a stripping-absorption-fractionating zone at a temperature in the range of 300 to 400° F., introducing a dry gas containing normally gaseous hydrocarbons at the base of said zone, withdrawing unabsorbed gas and vaporized water from the top of said zone, cooling said withdrawn gas and water vapor to effect condensation of a substantial part of the water vapor and returning said water condensate as reflux liquid to the top of said zone.

References Cited in the file of this patent

UNITED STATES PATENTS

| Number | Name | Date |
| --- | --- | --- |
| 2,088,048 | Bishop | July 27, 1937 |
| 2,357,095 | Evans et al. | Aug. 29, 1944 |
| 2,378,762 | Frey | June 19, 1945 |
| 2,424,884 | Matuszak | Jan. 28, 1947 |
| 2,428,524 | Matuszak | Oct. 7, 1947 |
| 2,487,306 | Carnell | Nov. 8, 1949 |
| 2,527,320 | McHarness et al. | Oct. 24, 1950 |
| 2,532,492 | Giachetta et al. | Dec. 5, 1950 |
| 2,564,071 | Lien et al. | Aug. 14, 1951 |